(12) United States Patent
Shen et al.

(10) Patent No.: US 10,468,661 B2
(45) Date of Patent: Nov. 5, 2019

(54) POWER BATTERY ASSEMBLY

(71) Applicants: Xi Shen, Shenzhen (CN); Jia Lu, Shenzhen (CN); Zhipei Lu, Shenzhen (CN); Jianhua Zhu, Shenzhen (CN)

(72) Inventors: Xi Shen, Shenzhen (CN); Jia Lu, Shenzhen (CN); Zhipei Lu, Shenzhen (CN); Jianhua Zhu, Shenzhen (CN)

(73) Assignees: SHENZHEN BYD AUTO R&D COMPANY LIMITED, Guangdong (CN); BYD COMPANY LIMITED, Shenzhen, Guangdong (CN)

(*) Notice: Subject to any disclaimer, the term of this patent is extended or adjusted under 35 U.S.C. 154(b) by 418 days.

(21) Appl. No.: 14/037,889

(22) Filed: Sep. 26, 2013

(65) Prior Publication Data

US 2014/0093752 A1    Apr. 3, 2014

(30) Foreign Application Priority Data

Sep. 28, 2012   (CN) .................... 2012 2 0502035 U

(51) Int. Cl.
*H01M 2/34* (2006.01)
*H01M 10/42* (2006.01)
(Continued)

(52) U.S. Cl.
CPC ............ *H01M 2/34* (2013.01); *B60L 3/0007* (2013.01); *B60L 3/0046* (2013.01); *B60L 3/0069* (2013.01); *B60L 3/04* (2013.01); *B60L 50/64* (2019.02); *B60L 58/21* (2019.02); *H01M 2/1077* (2013.01); *H01M 2/206* (2013.01); *H01M 2/348* (2013.01); *H01M 10/4257* (2013.01); *B60L 2240/545* (2013.01); *B60L 2240/547* (2013.01); *B60L 2240/549* (2013.01); *H01H 2085/025* (2013.01);
(Continued)

(58) Field of Classification Search
CPC ....................................................... H01M 4/583
See application file for complete search history.

(56) References Cited

U.S. PATENT DOCUMENTS 7,355,502 B1    4/2008  Nguyen et al.
2004/0021547 A1*  2/2004  Vicenza et al. ............... 337/186
(Continued)

FOREIGN PATENT DOCUMENTS

CN   101570181 A   11/2009
CN   101643054 A   2/2010
(Continued)

OTHER PUBLICATIONS

ISR to PCT/CN2013/084155 dated Jan. 9, 2014 (13p).

*Primary Examiner* — Alix E Eggerding
(74) *Attorney, Agent, or Firm* — Brinks Gilson & Lione; Yuezhong Feng

(57) ABSTRACT

A power battery assembly is provided. The power battery assembly comprises a battery circuit having at least one battery module and a relay. A normally open contact of the relay is connected with the battery circuit in series. The power battery assembly also comprises a controller for controlling the normally open contact of the relay. An input end and an output end of the relay are connected with the controller. The power battery assembly further comprises a fuse protector connected with the battery circuit in series.

22 Claims, 6 Drawing Sheets

(51) Int. Cl.
  *H01M 2/10*   (2006.01)
  *H01M 2/20*   (2006.01)
  *B60L 3/00*   (2019.01)
  *B60L 3/04*   (2006.01)
  *B60L 58/21*  (2019.01)
  *B60L 50/64*  (2019.01)
  *H01M 10/48*  (2006.01)
  *H01H 85/02*  (2006.01)

(52) U.S. Cl.
  CPC ............ *H01M 2/347* (2013.01); *H01M 10/48* (2013.01); *H01M 2200/00* (2013.01); *H01M 2200/103* (2013.01); *H01M 2220/20* (2013.01); *Y02T 10/7005* (2013.01); *Y02T 10/7061* (2013.01)

(56) References Cited

U.S. PATENT DOCUMENTS

2010/0127663 A1* 5/2010 Furukawa et al. ............ 320/134
2010/0194346 A1* 8/2010 Lee .................... H02J 7/0031
                                                        320/134
2012/0183813 A1   7/2012 Kim
2014/0093752 A1   4/2014 Shen et al.

FOREIGN PATENT DOCUMENTS

| CN | 101740839 A | 6/2010 | |
|---|---|---|---|
| CN | 201887440 | 6/2011 | |
| CN | 102142710 A | 8/2011 | |
| CN | 202080139 U | 12/2011 | |
| CN | 202839883 U | 3/2013 | |
| DE | 102011113798 A1 | 5/2012 | |
| GB | 2260635 A * | 4/1993 | ............ B60K 28/00 |
| JP | 2005005243 A | 1/2005 | |
| JP | 2006185709 | 7/2006 | |
| JP | 2002324478 | 11/2012 | |
| KR | 20120083850 A | 7/2012 | |
| WO | WO2012062255 A2 | 5/2012 | |

\* cited by examiner

POWER BATTERY ASSEMBLY

RELATED APPLICATIONS

This application claims priority and benefits of Chinese Patent Application No. 201220502035.1, filed with State Intellectual Property Office, P. R. China on Sep. 28, 2012, the entire content of which is incorporated herein by reference.

FIELD

The present disclosure generally relates to a power battery field, and, more particularly, to a power battery assembly having a multiple protection function.

BACKGROUND

With increasing requirements on environment protection, gas and diesel fueled vehicles are gradually being replaced by electric vehicles or hybrid electric vehicles. Power batteries are very important as the main power source of electric vehicles. The in-vehicle power battery generally comprises a plurality of battery modules connected in parallel and/or in series, needs to output powerful energy to meet a sufficient power output, and requires a high voltage, a large current, an excellent charging rate, and high safety performance.

A short-circuit of the power battery and a long term overloading can cause an abnormal condition of electric vehicles, and then cause an electrification of various metal components of electric vehicles. Thus, a user may come into contact with the high-voltage source, thus causing injury, which could lead to a terrible traffic accident. Moreover, when a maintenance person services electric vehicles, he may be hurt by the high voltage of the power battery. Furthermore, when a serious abnormal condition happens, for example, when an electric vehicle collides with a high-velocity mobile object and causes a short-circuit of the battery, the high voltage and large current in the battery can cause damage, such as a fire, when the battery is not cut off timely. Thus, high safety performance of the power battery is required.

SUMMARY

In one aspect, a power battery assembly comprises a battery circuit having at least one battery module and a relay. A normally open contact of the relay is connected with the battery circuit in series. The power battery assembly also comprises a controller for controlling the normally open contact of the relay. An input end and an output end of the relay are connected with the controller. The power battery assembly further comprises a fuse protector connected with the battery circuit in series.

In another aspect, an appliance comprises a power battery assembly. The power battery assembly comprises a battery circuit having at least one battery module and a relay. A normally open contact of the relay is connected with the battery circuit in series. The power battery assembly also comprises a controller for controlling the normally open contact of the relay. An input end and an output end of the relay are connected with the controller. The power battery assembly further comprises a fuse protector connected with the battery circuit in series.

In yet another aspect, a vehicle comprises a power battery assembly. The power battery assembly comprises a battery circuit having at least one battery module and a relay. A normally open contact of the relay is connected with the battery circuit in series. The power battery assembly also comprises a controller for controlling the normally open contact of the relay. An input end and an output end of the relay are connected with the controller. The power battery assembly further comprises a fuse protector connected with the battery circuit in series.

REFERENCE NUMERALS

Figure 1:
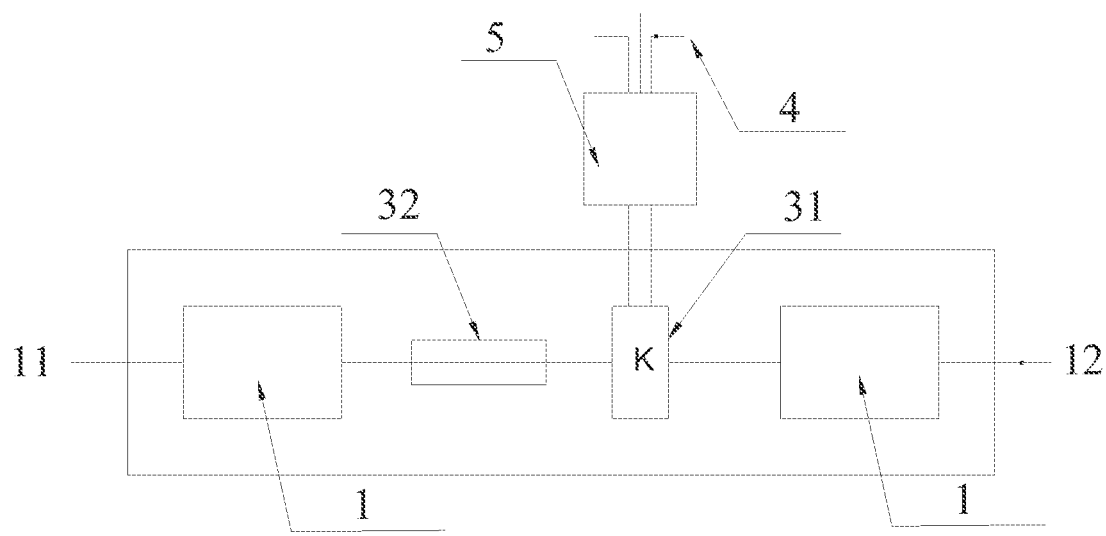
FIG. 1 is a block diagram of a power battery assembly according to an embodiment of the present disclosure.

1 Battery module
11 Positive electrode output end
12 Negative electrode output end
2 Pallet
3 Battery assembly protective device
31 Relay
32 Fuse protector
33 Mounting base
34 Upper cover
35 Positive leading-out terminal
36 Negative leading-out terminal
37 Connecting piece
311 Positive normally open contact
312 Negative normally open contact
313 Input/output end of the relay
314 Fixing member
321 Positive end
322 Negative end
4 Sensor
5 Controller
6 Nut

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the related art, some power battery assemblies use a fuse protector connected in series with the battery module. When a large current flows through the fuse protector, the temperature of the fuse protector increases, and then the fuse protector is fused to cut off the circuit. The fuse protector is responsive. However, once the fuse protector is fused, it cannot be reset and needs to be replaced by a new one, thus increasing the cost.

Some power battery assemblies adopt a relay connected with a controller to protect the circuit, two low-voltage input/output ends of the relay are connected with the controller, and the relay is controlled to turn on or off by the controller. Several sensors such as a collision sensor, a temperature sensor and a voltage sensor are distributed at various locations in the power battery assembly and the electric appliance (such as the electric vehicle). When an abnormal condition occurs in the vehicle or the power battery assembly, the sensors send a signal to the controller, and the controller sends an instruction to the relay according to the signal so as to turn off the relay. Thus, the connection between the battery modules is cut off, and the power battery assembly is divided into several independent battery modules each having a voltage within the range of safety voltage, thus ensuring the safety. However, as the relay is turned off based on the control of the controller, which needs to wait for the signal sent from the various sensors, the relay may not be turned off timely. Moreover, when a short-circuit occurs in the battery module and a large current is generated, a sintering phenomenon may happen in the relay, such that the relay may not able to operate and cut off the circuit actively.

Some battery assemblies are provided with a fuse protector connected in series with the battery module and the relay connected with the controller, and the relay is connected with the fuse protector and the battery module in parallel. Each battery module is monitored and when an abnormal condition happens, only the battery module having a fault is turned off, whereas the battery circuit is not cut off. When a short-circuit caused by the large current occurs, it cannot have a low-voltage protection function.

Embodiments of the present disclosure seek to solve at least one of the problems existing in the prior art to at least some extent, particularly to provide a safe and reliable power battery assembly which can realize a multiple protection.

Embodiments of the present disclosure provide a power battery assembly. The power battery assembly comprises a battery circuit having at least one battery module and a relay, in which a normally open contact of the relay is connected with the battery circuit in series. The power battery assembly also comprises a controller for controlling the normally open contact of the relay, in which an input/output end of the relay is connected with the controller respectively, and a fuse protector connected with the battery circuit in series. When the relay is turned off, the power battery assembly is divided into a plurality of independent battery modules by the relay, and a voltage of each battery module is less than or equal to a safety voltage. When the relay is turned on, the power battery assembly is in a closed high-voltage state. At this time, when a serious abnormal condition such as a short-circuit occurs, a large current is generated in the battery circuit. As the relay is controlled by an instruction which is generated by the controller according to a signal received from a sensor and there is a response lag in the sensor, the relay may not be turned off timely. Thus, the large current will fuse the fuse protector to divide the power battery assembly into a plurality of independent battery modules, and the voltage of each battery module is less than or equal to the safety voltage, thus ensuring the safety and avoiding further damages to the battery modules.

In one embodiment, the power battery assembly comprises one battery module, the one battery module has a first electrode output end connected with the normally open contact of the relay and a second electrode output end connected with the fuse protector. The first electrode output end and the second output electrode output end represent the electrode output ends having different polarities, in which the first electrode output end may be a positive electrode output end or a negative electrode output end of the battery module.

In another embodiment, the power battery assembly comprises at least a first battery module and a second battery module connected in series and/or in parallel, each battery module has a first electrode output end and a second electrode output end. The relay has a first normally open contact connected with the first electrode output end of the first battery module and a second normally open contact connected with the second electrode output end of the battery module adjacent to the first battery assembly. The fuse protector has a first end connected with the first electrode output end of the second battery module and a second end connected with the second electrode output end of the battery module adjacent to the second battery module. In other words, the fuse protector and the relay are connected in series between a plurality of battery modules and spaced apart from each other by the battery modules. Alternatively, the electrode output ends of the battery module at a head or a tail of the battery circuit may be connected in series with a relay and/or a fuse protector. The terms "first battery module" and "second battery module" represent different battery modules rather than represent an order of the battery modules, and the second battery module may be adjacent to the first battery module.

In yet another embodiment, the power battery assembly comprises one battery module having a first electrode output end and a second electrode output end, the relay and the fuse protector are connected directly to form a battery assembly protective device, and the battery assembly protective device is connected in series with at least one of the first electrode output end and the second electrode output end.

In still another embodiment, the power battery assembly comprises a plurality of battery modules, each battery module has a first electrode output end and a second electrode output end. The relay and the fuse protector are directly connected to form a battery assembly protective device. A first end of the battery assembly protective device is connected with the first electrode output end of a first battery module, and a second end of the battery assembly protective device is connected with the second electrode output end of a second battery module adjacent to the first battery module.

Further, the power battery assembly may comprise: a shell for packaging the relay and the fuse protector, and a first leading-out terminal and a second leading-out terminal extended out of the shell to connect with external devices.

In some embodiments, the first normally open contact of the relay is connected with the first leading-out terminal via a nut. The second normally open contact of the relay is connected with a first end of the fuse protector via a connecting piece. The connecting piece is connected with the relay and the fuse protector via a nut respectively, and a second end of the fuse protector is connected with the second leading-out terminal via a nut.

In some embodiments, the shell comprises: a mounting base, on which the relay and the fuse protector are mounted; and an upper cover connected with the mounting base via a nut.

Further, the relay has a fixing member formed on a bottom of the relay, and the fixing member is fixed on the mounting base via a nut.

In some embodiments, the power battery module comprises a pallet, the battery module is located on the pallet, and the mounting base is fixed on a surface of the pallet.

In some embodiments, the plurality of battery modules are connected in series and the power battery assembly comprises a plurality of battery assembly protective devices with each battery assembly protective device connected in series with the plurality of battery modules. In other words, the power battery assembly is protected by a plurality of battery assembly protective devices.

In some embodiments, one battery assembly protective device is connected between every two battery modules.

In some embodiments, the power battery assembly further comprises a sensor configured to send a signal to the controller for controlling the relay.

The power battery assembly according to embodiments of the present disclosure has at least one of the following advantages.

(1) When the power battery assembly is in a non-working state (such as, storage, transportation, maintenance, or before powering on the electric vehicle), the relay is in a normally open state, the power battery assembly is divided into a plurality of independent battery modules, and a voltage of each battery assembly is substantially equal to or less than the safety voltage. Thus, the power battery assembly has a relatively higher safety.

(2) When some abnormal conditions (such as an insulation failure, an overhigh temperature and an electric leakage) occurs in a certain battery module during the operation of the power battery assembly, the controller controls the relay to turn off so as to divide the power battery assembly into a plurality of independent battery modules, thus avoiding further damages to the abnormal battery module or an influence on other battery modules and ensuring the safety of the power battery assembly.

(3) When an abnormal condition (such as a collision) occurs in an electric appliance (such as the electric vehicle) using the power battery assembly and the abnormal condition is not serious, the relay is turned off, and the battery assembly is divided into a plurality of independent low-voltage battery modules, thus ensuring the safety of the power battery assembly. However, when the abnormal condition is serious and the relay is not turned off timely, the fuse protector connected with the battery circuit in series will operate instantaneously and divide the power battery assembly into a plurality of independent low-voltage battery modules, thus ensuring the safety of the power battery assembly and preventing the potential risks.

(4) As the relay has an active protection function and a recovery characteristic, the power battery assembly can work normally after a failure is removed.

(5) The power battery assembly is simple in structure, low in cost, precise in control, and convenient in maintenance.

Figure 2:
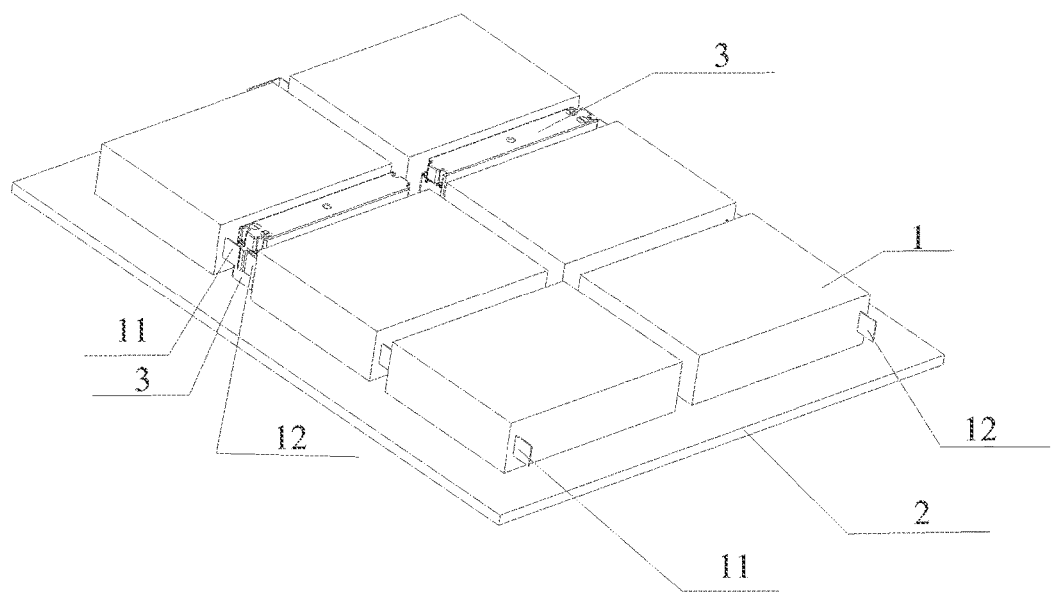
FIG. 2 is a schematic perspective view of a power battery assembly according to an embodiment of the present disclosure.

FIG. 1 is a block diagram of a power battery assembly according to an embodiment of the present disclosure. FIG. 2 is a schematic perspective view of a power battery assembly according to an embodiment of the present disclosure. As shown in FIGS. 1 and 2, the power battery assembly according to an embodiment of the present disclosure comprises a battery circuit, a relay 31, a fuse protector 32, and a controller 5.

The battery circuit has at least one battery module 1. A normally open contact of the relay 31 is connected with the battery circuit in series. The controller 5 is used to control the normally open contact of the relay 31, and an input/output end of the relay 31 is connected with the controller 5. The fuse protector 32 is connected with the battery circuit in series. When the relay 31 is turned off, the power battery assembly is divided into several independent battery modules 1 by the relay 31, and a voltage of each battery module 1 is less than or equal to the safety voltage. When the relay 31 is turned on, the power battery assembly is in a closed high-voltage state. At this time, if an abnormal condition such as a short-circuit occurs, a large current is generated in the battery circuit. Moreover, as the relay 31 is controlled by the controller 5 which sends an instruction to the relay 31 according to a signal received from a sensor 4 and there is a response lag in the sensor 4, the relay 31 may not be turned off timely. Thus, the large current may fuse the fuse protector 32 to divide the power battery assembly into several independent battery modules 1, and the voltage of each battery module 1 is less than or equal to the safety voltage, thus ensuring the safety and avoiding a further damage to the battery modules 1.

According to one embodiment of the present disclosure, the power battery assembly is provided with the relay 31 and the fuse protector 32 connected with the battery circuit in series without making a limitation on other components and the connection relation thereof in the power battery assembly. For example, as shown in FIG. 2, the power battery assembly comprises a plurality of assembly modules 1 connected in series and/or in parallel. The plurality of assembly modules 1 may be fixed on a pallet 2. Each of the plurality of assembly modules 1 has a first electrode output end and a second electrode output end for outputting a positive current and a negative current, respectively. The first electrode output end may be a positive electrode output end 11 or a negative electrode output end 12. When the first electrode output end is the positive electrode output end 11, the second electrode output end is the negative electrode output end 12. When the first electrode output end is the negative electrode output end 12, the second electrode output end is the positive electrode output end 11. Each battery module 1 may have one positive electrode output end 11 and one negative electrode output end 12, or may have a plurality of positive electrode output ends 11 and a plurality of negative electrode output ends 12. The positive electrode output end 11 and the negative electrode output end 12 are generally formed as electric conductors, and may be of any shapes, such as, a platelike shape. The battery modules 1 are connected in series by welding the positive electrode output end 11 of one battery module 1 and the negative electrode output end 12 of another battery module 1 so as to form the power battery assembly. Alternatively, the battery modules 1 are connected in parallel by welding the positive electrode output end 11 of one battery module 1 and the positive electrode output end 11 of another battery module 1 to form the power battery assembly. As shown in FIG. 2, six battery modules 1 are connected in series by welding the positive electrode output end 11 of one battery module 1 and the negative electrode output end 12 of another battery module 1 so as to form the battery circuit. The negative electrode output end 12 of the first battery module 1 at a head of the battery circuit is used as the negative electrode output end of the power battery assembly, and the positive electrode output end 11 of the sixth battery module 1 at a tail of the battery circuit is used as the positive electrode output end of the power battery assembly. The battery module 1 generally comprises a plurality of battery cells connected in series and/or in parallel, and the detailed description thereof will be omitted here.

Figure 5:
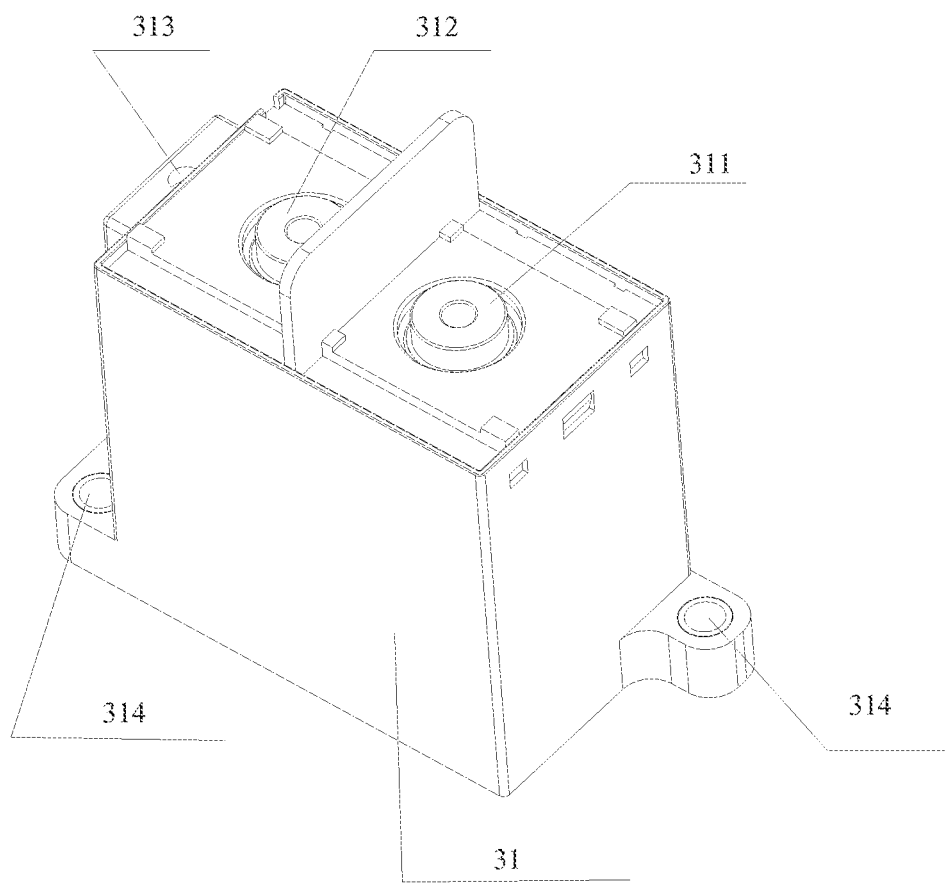
FIG. 5 is a schematic perspective view showing a relay according to an embodiment of the present disclosure.

The relay 31 may be any kind of relay in the art, such as a relay having a high voltage and a large direct current power. The rated power of the relay 31 should be greater than an upper limit of a normal working current of the power battery assembly. The size, operating temperature and lifetime of the relay 31 should meet the operating requirements. FIG. 5 is a schematic perspective view of a relay according to an embodiment of the present disclosure. As shown in FIG. 5, the relay 31 has two normally open contacts, i.e., a positive normally open contact 311 and a negative normally open contact 312 used to be connect with the battery circuit. The positive normally open contact 311 and the negative normally open contact 312 may be connected with the battery circuit by screw connecting, plugging or welding. Thus, each of the positive normally open contact 311 and the negative normally open contact 312 may be formed as a piece, a column, or a component having a slotted hole or a threaded hole therein according to actual requirements. For example, as shown in FIG. 5, two threaded holes insulated from each other are formed in an upper surface of the relay 31 to form the positive normally open contact 311 and the negative normally open contact 312 respectively. In this condition, a slotted hole may be formed in the platelike electrode output end of the battery module 1, and when the relay 31 is connected between two battery modules 1, the platelike electrode output end is fixed with the relay 31 via a nut 6. The relay 31 further has an input/output end 313. The input/output end 313 may be connected with the controller 5 via a wire or a conducting strip, thus realizing a control of the controller 5 on the relay 31. The controller 5 may be disposed in the power battery assembly, or may be disposed outside the power battery assembly as a part of a control system of the electric vehicle.

The controller 5 may control the relay 31 by receiving various signals. For example, the controller 5 may be connected with the sensor 4 to receive the signal fed back from the sensor 4, or may receive other wireless signals sent from the other components of the electric appliance. In one embodiment, the controller may control the relay 31 to turn on or off according to the signal sent from several sensors such as a collision sensor, a temperature sensor and a voltage sensor distributed at various locations of the power battery assembly and the electric appliance so as to cut off the battery circuit when needed. A fixing member 314 for fixing the relay 31 may be formed on a bottom of the relay 31. As shown in FIG. 5, the relay 31 has two fixing members 314 extended from two symmetric corners of the bottom thereof, and the two fixing members 314 may be fixed on the pallet 2 via a nut 6 so as to fix the relay 31 in the power battery assembly.

Figure 6:
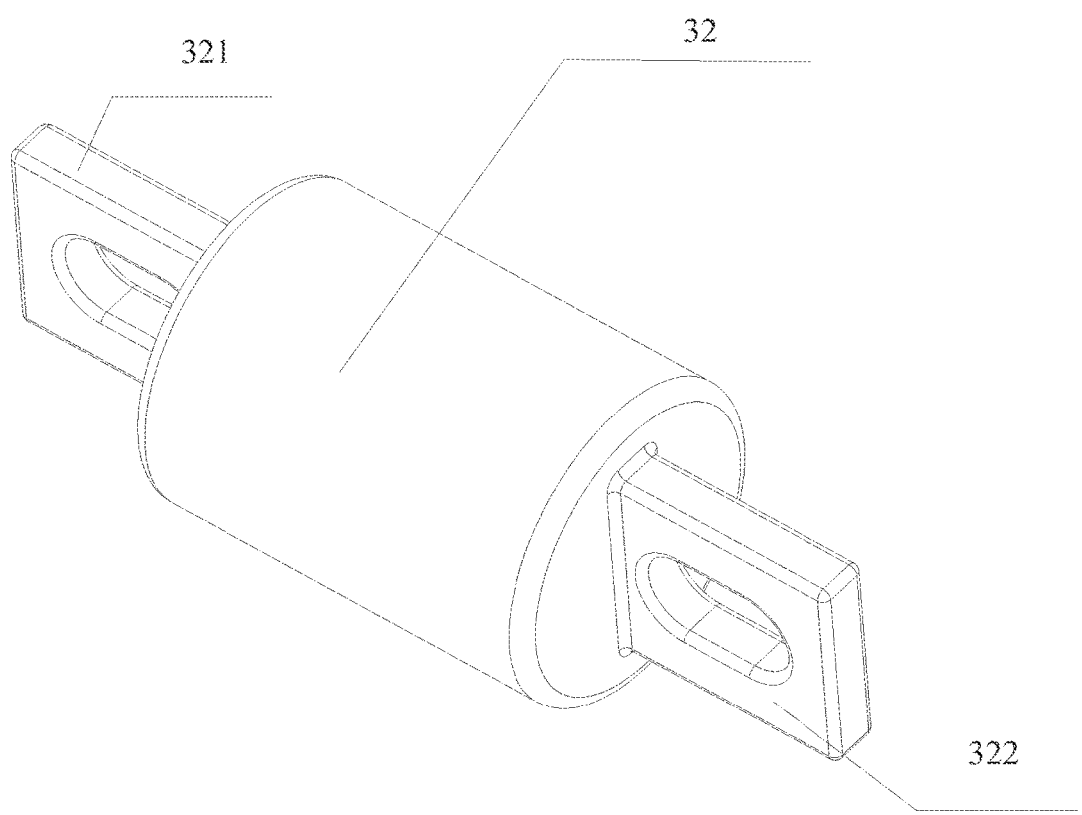
FIG. 6 is a schematic perspective view showing a fuse protector according to an embodiment of the present disclosure.

The fuse protector 32 may be any kind of fuse protector in the art and may be designed according to the safety current of the battery circuit. According to one embodiment of the present disclosure, the fuse protector 32 is fused only when a serious abnormal condition occurs and the relay 31 is not turned off timely by the controller 5. Therefore, a fuse protector 32 having a high fusing temperature is generally used. Advantageously, the operating temperature of the fuse protector 32 is slightly less than a possible sintering temperature of the relay 31. When a too large current flows through the fuse protector 32, the temperature of the fuse protector 32 increases, and when the temperature of the fuse protector 32 reaches the operating temperature, the fuse protector 32 is fused to cut off the battery circuit. As shown in FIG. 6, the fuse protector 32 has a positive end 321 and a negative end 322 used to connect with the battery circuit. The positive end 321 and the negative end 322 may be connected with the battery circuit by screw connecting, plugging, or welding. Thus, each of the positive end 321 and the negative end 322 may be formed as a piece, a column or a component having a slotted hole or a threaded hole therein according to actual requirements. For example, slotted holes are formed in the positive end 321 and the negative end 322, as shown in FIG. 6. When the battery module 1 uses soft connecting bands as the electrode output ends, the positive end 321 and the negative end 322 of the fuse protector 32 may be connected with the soft connecting bands of two battery modules 1 by welding, for example, by soldering respectively. Alternatively, the positive end 321 and the negative end 322 of the fuse protector 32 are connected with the electrode output ends by screw connecting. For example, the electrode output ends of the battery module 1 is formed as studs, the positive end 321 and the negative end 322 are provided with the slotted holes as shown in FIG. 6, and thus a screw connection can be realized by a match of the studs, nuts 6 and the slotted holes. Alternatively, the positive end 321 and the negative end 322 may be connected with the electrode output ends by a combination of screw connecting and welding, thus realizing a more firm connection. Certainly, the positive end 321 and the negative end 322 may be connected with the electrode output ends by plugging. For example, the electrode output ends of the battery module 1 are formed as female ends, the positive end 321 and the negative end 322 are provided with male ends, and the female ends are connected with the male ends by plugging.

The fuse protector 32 and the relay 31 may or may not be connected directly, as long as they are connected with the battery circuit in series. The power battery assembly may comprise one or more battery modules 1. For example, when the power battery assembly comprises one battery module 1, the fuse protector 32 and the relay 31 may be connected in series with two ends of the battery module 1 respectively. For example, the positive electrode output end 11 of the battery module 1 is connected with the positive normally open contact 311 of the relay 31, the negative electrode output end 12 of the battery module 1 is connected with the negative end 322 of the fuse protector 32, and the negative normally open contact 312 of the relay 31 and the positive end 321 of the fuse protector are connected with external devices. When the power battery assembly comprises a plurality of battery modules 1, the relay 31 and the fuse protector 32 may be connected in series between the plurality of battery modules 1 and spaced apart from each other by the battery modules 1. Certainly, the electrode output ends of the battery module 1 at a head or a tail of the battery circuit may be connected in series with a relay 31 and/or a fuse protector 32. For example, when the power battery assembly comprises a first battery module and a second battery module and the negative electrode output end of the first battery module is connected with the positive electrode output end of the second battery module, one relay 31 may be connected between the two battery modules, and at least one of the positive electrode output end of the first battery module and the negative electrode output end of the second battery module may be connected with one fuse protector 32. Alternatively, one fuse protector 32 may be connected between the two battery modules, and at least one of the positive electrode output end of the first battery module and the negative electrode output end of the second battery module may be connected with one relay 31. When the power battery assembly comprises a first battery module, a second battery module and a third battery module, one relay 31 may be connected in series between the first battery module and the second battery module, and one fuse protector 32 may be connected in series between the second battery module and the third battery module. Alternatively, at least one of the electrode output ends of the first battery module and the third battery module may be connected in series with one fuse protector 32 and/or one relay 31. When the power battery module comprises four battery modules 1, there may be one fuse protector 32 and one relay 31 connected in series between the four battery modules 1 and spaced apart from each other, and there may also be a plurality of fuse protectors 32 and a plurality of relays 31 according to actual requirements. The relay 31 and the fuse protector 32 may be mounted on the pallet 2, for example, by commonly used fixed connecting.

Figure 3:
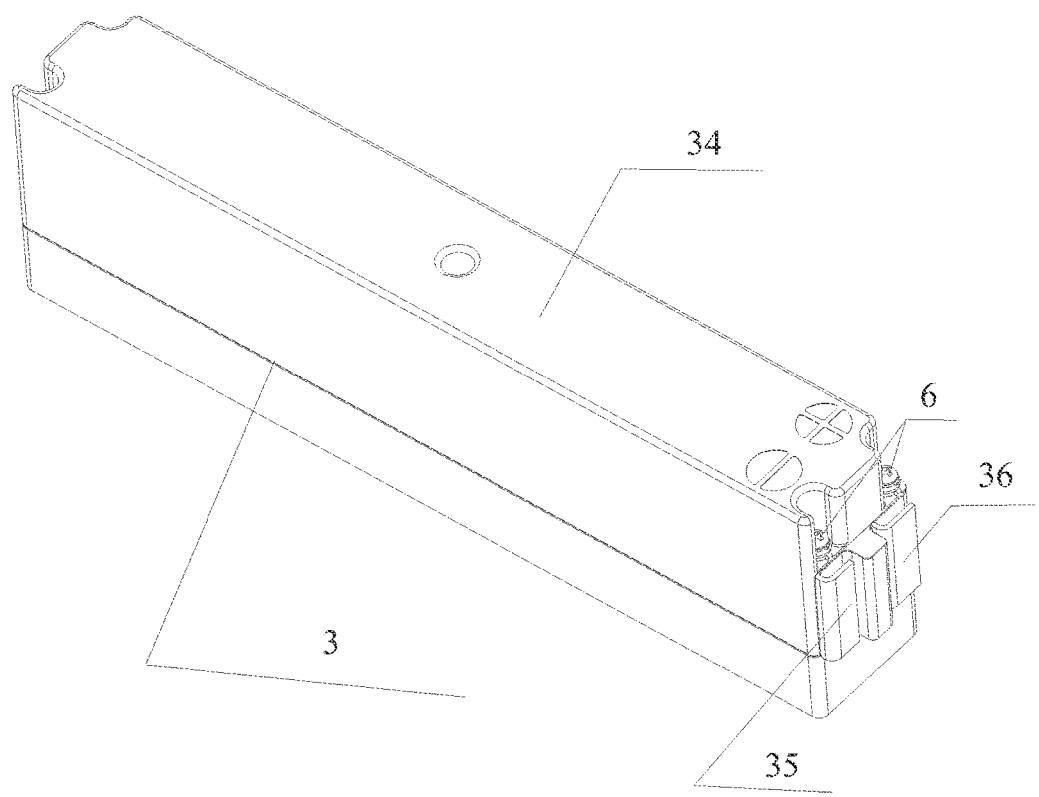
FIG. 3 is a schematic perspective view of a power assembly protective device according to an embodiment of the present disclosure.
Figure 4:
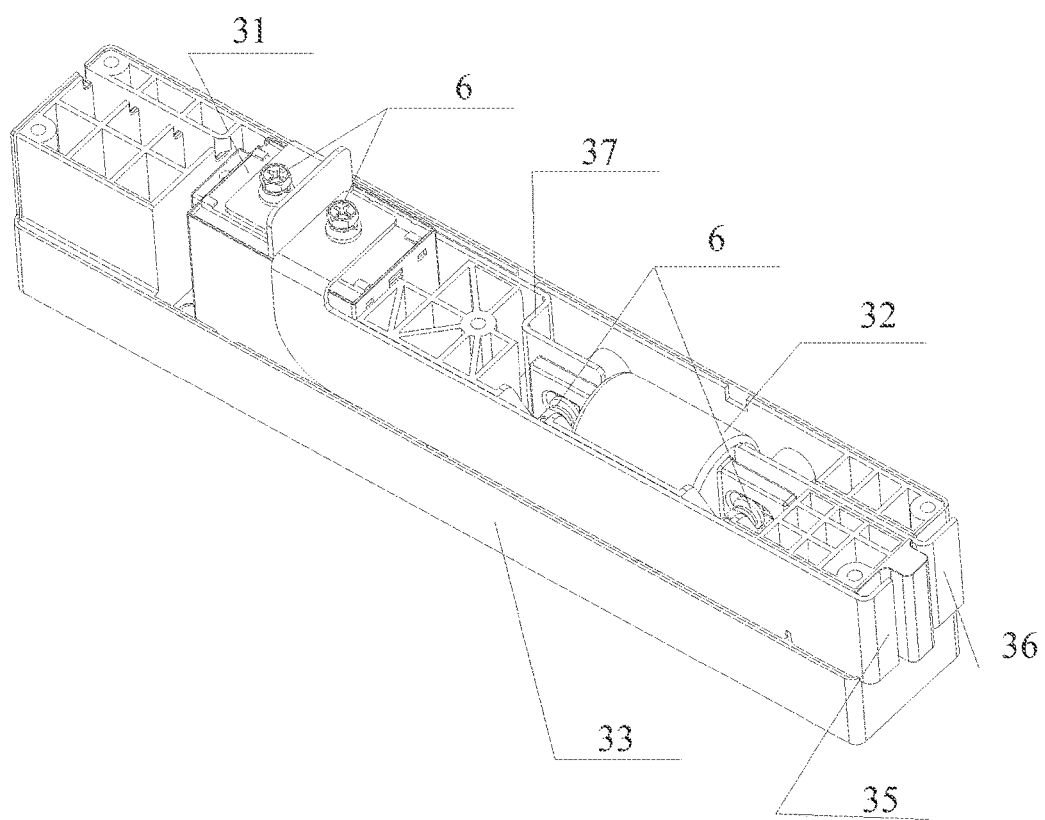
FIG. 4 is a schematic perspective view showing an inner structure of a power assembly protective device according to an embodiment of the present disclosure.

The relay 31 and the fuse protector 32 may be connected directly to form a battery assembly protective device 3, which is used as a whole. FIG. 3 is a schematic perspective view of a battery assembly protective device according to an embodiment of the present disclosure, and FIG. 4 is a schematic perspective view of an inner structure of a battery assembly protective device according to an embodiment of the present disclosure. As shown in FIGS. 3 and 4, the relay 31 and the fuse protector 32 are directly connected in series to form the battery assembly protective device 3. The battery assembly protective device 3 has a positive leading-out terminal 35 and a negative leading-out terminal 36 used to connect with the battery circuit. The positive leading-out terminal 35 and the negative leading-out terminal 36 may be connected with the battery circuit by screw connecting, plugging or welding. Thus, each of the positive leading-out terminal 35 and the negative leading-out terminal 36 may be formed as a piece, a column or a component having a slotted hole or a threaded hole therein according to actual requirements. In one embodiment of the present disclosure, each of the positive leading-out terminal 35 and the negative leading-out terminal 36 is formed as a piece, and is connected with the platelike electrode output end by soldering. Specifically, a first normally open contact of the relay 31 is connected with a first end of the fuse protector 32, and a second normally open contact of the relay 31 and a second end of the fuse protector 32 are used as the positive leading-out terminal 35 and the negative leading-out terminal 36 respectively. For example, the positive normally open contact 311 of the relay 31 is connected with the negative end 322 of the fuse protector 32, or the negative normally open contact 312 of the relay 31 is connected with the positive end 321 of the fuse protector 32. The connection between the relay 31 and the fuse protector 32 may be realized by soldering, screw connecting or plugging. In one embodiment of the present disclosure, the first normally open contact of the relay 31 is connected with the first end of the fuse protector 32 via a connecting piece 37. The connecting piece 37 is formed as an electric conductor, and the material of the connecting piece 37 may be silver, copper, copper alloy, aluminum, aluminum alloy or any other conductive metal. The shape of the connecting piece 37 may be designed according to actual requirements, for example, may be curved. The connecting piece 37 is connected with the relay 31 and the fuse protector 31 via the nuts 6 respectively.

In some embodiments, the battery assembly protective device 3 further comprises a first leading-out terminal and a second leading-out terminal to connect with external devices. The second normally open contact of the relay 31 and the second end of the fuse protector 32 are directly used as a first leading-out terminal and a second leading-out terminal. The first leading-out terminal and the second leading-out terminal are platelike and are used as electrically connecting ends of the battery assembly protective device to be connected with the second normally open contact of the relay 31 and the second end of the fuse protector 32 respectively. Each of the first leading-out terminal and the second leading-out terminal may be generally formed as an electric conductor according to actual requirements. In one embodiment, each of the first leading-out terminal and the second leading-out terminal is formed as a bent piece extended out of the battery assembly protective device 3 after being connected with the relay 31 or the fuse protector 32. The first leading-out terminal and the second leading-out terminal may be connected with the relay 31 or the fuse protector 32 by soldering, screw connecting or plugging. In one embodiment, the second normally open contact of the relay 31 is connected with the first leading-out terminal via the nut 6, and the second end of the fuse protector 32 is connected with the second leading-out terminal via the nut 6. The first leading-out terminal and the second leading-out terminal output different polarities. In one embodiment, the first leading-out terminal is the positive leading-out terminal 35, and the second leading-out terminal is the negative leading-out terminal 36. The positive leading-out terminal 35 is connected with the positive normally open contact 311 of the relay 31 via the nut 6, and the negative normally open contact 312 of the relay 31 is connected with the positive end 321 of the fuse protector 32 via the connecting piece 37. The negative end 322 of the fuse protector 32 is connected with the negative leading-out terminal 36 via the nut 6. The positive leading-out terminal 35 is connected with the negative electrode output end 12 of one battery module 1, and the negative leading-out terminal 36 is connected with the positive electrode output end 11 of the battery module 1 adjacent to the one battery module 1, such that the battery assembly protective device 3 is connected in series with the battery circuit.

The battery assembly protective device 3 may further comprise other components, such as a supporting member. In one embodiment of the present disclosure, the battery assembly protective device 3 advantageously comprises a shell for packaging the relay 31 and the fuse protector 32. The first leading-out terminal and the second leading-out terminal are extended out of the shell to connect with external devices. Advantageously, the shell comprises a mounting base 33 and an upper cover 34. The relay 31 and the fuse protector 32 are mounted on the mounting base 33. In one embodiment, the fixing member 314 formed on a bottom of the relay 31 is fixed on the mounting base 33 via the nut 6, thus fixing the relay 31 on the mounting base 33. The supporting member may be formed on the mounting base 33 to fix the fuse protector 32 on the mounting base 33. Other components and structures for fixing these components may be formed on the mounting base 33 according to actual requirements. For example, some fastening structures for fixing and connecting may also be formed on the mounting base 33, some frames for preventing the fuse protector 32 and the relay 31 from shaking may also be provided, and the detailed description thereof will be omitted herein. The upper cover 34 may be connected with the mounting base 33 by any connecting means well known in the art, for example, by gluing. Advantageously, the upper cover 34 is connected with the mounting base 33 via the nut 6. In one embodiment, the mounting base 33 is provided with four threaded holes at four corners thereof. The upper cover 34 is provided with four holes at four corners thereof for passing the nuts 6. The upper cover 34 may also be provided with a threaded hole in the central plane thereof for buffering force, and then the upper cover 34 is secured with the mounting base 33 via the nuts 6. The holes for leading out the wire connected with the input/output end 313 of the relay 31 may be formed in the surface of the upper cover 34 or in the mounting base 33, in which the input/output end 313 of the relay 31 is connected with the controller 5 via the wire. The battery assembly protective device 3 is generally fixed on the pallet 2, and the bottom of the mounting base 33 may be fixed on a surface of the pallet 2 by any fixing means.

The power battery assembly may comprise one or more battery assembly protective devices 3. For example, when the power battery assembly comprises a plurality of battery modules 1, one battery assembly protective device 3 may be connected between two adjacent battery modules 1 or there may be two or more battery modules 1 between two battery assembly protective devices 3. Specifically, according to the parameters of the relay 31 and the fuse protector 32, when the voltage of the serial battery modules 1 reaches a preset value, one battery assembly protective device 3 is provided. In one embodiment, the preset value is 48V, the power battery assembly comprises six 24V battery modules 1 connected in series, and one battery assembly protective device 3 is connected between every two battery modules 1.

The power battery assembly may comprise the fuse protector 32 and the relay 31 connected in series with the battery circuit and spaced apart from each other, may comprise the battery assembly protective device 3 formed by connecting the fuse protector 32 and the relay 31 directly, may comprise the battery assembly protective device 3 and an independent fuse protector 32, may comprise the battery assembly protective device 3 and an independent relay 31, or may comprise the battery assembly protective device 3, an independent relay 31 and an independent fuse protector 32.

When the power battery assembly according to embodiments of the present disclosure is in a non-working state (such as, storage, transportation, maintenance, or before powering on the electric vehicle), the relay is in a normally open state, the power battery assembly is divided into a plurality of independent battery modules, and a voltage of each battery assembly is substantially equal to or less than the safety voltage. Thus, the power battery assembly has a relatively higher safety. When some abnormal conditions (such as an insulation failure, an overhigh temperature and an electric leakage) occurs in a certain battery module during the operation of the power battery assembly, the controller controls the relay to turn off so as to divide the power battery assembly into a plurality of independent battery modules, thus avoiding further damages to the abnormal battery module or an influence on other battery modules and ensuring the safety of the power battery assembly. When an abnormal condition (such as a collision) occurs in the electric appliance (such as the electric vehicle) using the power battery assembly and the abnormal condition is not serious, the relay is turned off, and the battery assembly is divided into a plurality of independent low-voltage battery modules, thus ensuring the safety of the power battery assembly. However, when the abnormal condition is serious and the relay is not turned off timely, the fuse protector connected with the battery circuit in series will operate instantaneously and divide the power battery assembly into a plurality of independent low-voltage battery modules, thus ensuring the safety of the power battery assembly and preventing the potential risks. As the relay used in the power battery assembly according to embodiments of the present disclosure has an active protection function and a recovery characteristic, the power battery assembly can work normally after a failure is removed. Furthermore, the power battery assembly is simple in structure, low in cost, precise in control, and convenient in maintenance.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

The invention claimed is:

1. A power battery assembly, comprising:
    a battery circuit having at least one battery module;
    a relay having a sintering temperature, wherein a normally open contact of the relay is connected with the battery circuit in series;
    a controller for controlling the normally open contact of the relay, wherein an input/output end of the relay is connected with the controller;
    a sensor, configured to send a signal to the controller for controlling the relay; and
    a fuse protector having a fusing temperature lower than the sintering temperature of the relay, the fuse protector connected with the battery circuit in series, the controller configured to control the relay to turn off when the controller receives an abnormal signal from the sensor, and configured to have the fusion protector fused when the controller receives an abnormal signal from the sensor and
    the relay is not turned off by the controller upon lapse of the sensor response lag time.

2. The power battery assembly according to claim 1, wherein the power battery assembly comprises one battery module, the one battery module having a first electrode output end connected with the normally open contact of the relay and a second electrode output end connected with the fuse protector.

3. The power battery assembly according to claim 1, wherein the power battery assembly comprises at least a first battery module and a second battery module connected in series and/or in parallel, each battery module has a first electrode output end and a second electrode output end, and wherein the relay has a first normally open contact connected with the first electrode output end of the first battery module and a second normally open contact connected with the second electrode output end of the battery module adjacent to the first battery assembly, and the fuse protector has a first end connected with the first electrode output end of the second battery module and a second end connected with the second electrode output end of the battery module adjacent to the second battery module.

4. The power battery assembly according to claim 1, wherein the power battery assembly comprises one battery module having a first electrode output end and a second electrode output end, the relay and the fuse protector are connected directly to form a battery assembly protective device, and the battery assembly protective device is connected in series with at least one of the first electrode output end and the second electrode output end.

5. The power battery assembly according to claim 4, wherein the battery assembly protective device further comprises:
   a shell for packaging the relay and the fuse protector.

6. The power battery assembly according to claim 5, wherein the shell comprises:
   a mounting base, on which the relay and the fuse protector are mounted; and
   an upper cover connected with the mounting base.

7. The power battery assembly according to claim 4, wherein the battery assembly protective device further comprises:
   a first leading-out terminal and a second leading-out terminal extended out of the shell to connect with external devices.

8. The power battery assembly according to claim 7, wherein the first normally open contact of the relay is connected with the first leading-out terminal, the second normally open contact of the relay is connected with a first end of the fuse protector via a connecting piece, the connecting piece is connected with the relay and the fuse protector, and a second end of the fuse protector is connected with the second leading-out terminal.

9. The power battery assembly according to claim 1, wherein the power battery assembly comprises a plurality of battery modules, each battery module has a first electrode output end and a second electrode output end, and wherein the relay and the fuse protector are directly connected to form a battery assembly protective device, a first end of the battery assembly protective device is connected with the first electrode output end of a first battery module, and a second end of the battery assembly protective device is connected with the second electrode output end of a second battery module adjacent to the first battery module.

10. The power battery assembly according to claim 9, wherein the battery assembly protective device further comprises:
   a shell for packaging the relay and the fuse protector.

11. The power battery assembly according to claim 10, wherein the shell comprises:
   a mounting base, on which the relay and the fuse protector are mounted; and
   an upper cover connected with the mounting base.

12. The power battery assembly according to claim 9, wherein the battery assembly protective device further comprises:
   a first leading-out terminal and a second leading-out terminal extended out of the shell to connect with external devices.

13. The power battery assembly according to claim 12, wherein the first normally open contact of the relay is connected with the first leading-out terminal, the second normally open contact of the relay is connected with a first end of the fuse protector via a connecting piece, the connecting piece is connected with the relay and the fuse protector, and a second end of the fuse protector is connected with the second leading-out terminal.

14. The power battery assembly according to claim 9, wherein the plurality of battery modules are connected in series.

15. The power battery assembly according to claim 14, wherein the power battery assembly comprises a plurality of battery assembly protective devices with the battery assembly protective device connected in series with the plurality of battery modules.

16. The power battery assembly according to claim 14, wherein one battery assembly protective device is connected between every two battery modules.

17. The power battery assembly according to claim 1, wherein the sensor is a voltage sensor, configured to send a voltage signal to the controller for controlling the relay.

18. The power battery assembly according to claim 1, wherein the sensor is a collision sensor, configured to send a collision signal to the controller for controlling the relay.

19. The power battery assembly according to claim 1, wherein the sensor is a temperature sensor, configured to send a temperature signal to the controller for controlling the relay.

20. The power battery assembly according to claim 1, wherein the abnormal signal is an insulation failure, an over temperature, an electric leakage, an over current, an overvoltage, or a collision signal.

21. An appliance, comprising:
   a power battery assembly, the power batter assembly comprising:
      a battery circuit having at least one battery module;
      a relay having a sintering temperature, wherein a normally open contact of the relay is connected with the battery circuit in series;
      a controller for controlling the normally open contact of the relay, wherein an input/output end of the relay is connected with the controller;
      a sensor, configured to send a signal to the controller for controlling the relay; and
      a fuse protector having a fusing temperature lower than the sintering temperature of the relay, the fuse protector connected with the battery circuit in series, the controller programmed to control the relay to turn off when the controller receives an abnormal signal from the sensor, and programmed to have the fusion protector fused when the controller receives an abnormal signal from the sensor and
   the relay is not turned off by the controller upon lapse of the sensor response lag time.

22. A vehicle, comprising:
   a power battery assembly, the power batter assembly comprising:
      a battery circuit having at least one battery module;
      a relay having a sintering temperature, wherein a normally open contact of the relay is connected with the battery circuit in series;
      a controller for controlling the normally open contact of the relay, wherein an input/output end of the relay is connected with the controller;
      a sensor, configured to send a signal to the controller for controlling the relay; and
      a fuse protector having a fusing temperature lower than the sintering temperature of the relay, the fuse protector connected with the battery circuit in series, the controller programmed to control the relay to turn off when the controller receives an abnormal signal from the sensor, and programmed to have the fusion protector fused when the controller receives an abnormal signal from the sensor and
the relay is not turned off by the controller upon lapse of the sensor response lag time.

* * * * *